March 17, 1931.  C. F. HOVER  1,797,087
PITMAN CONNECTION
Filed Nov. 6, 1929
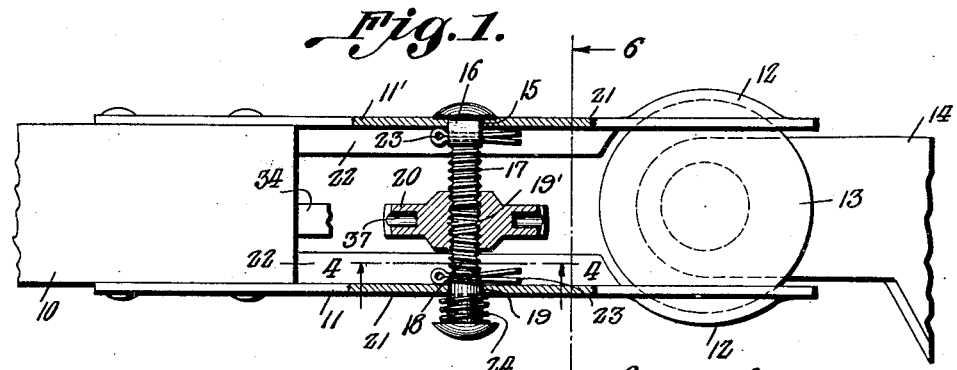
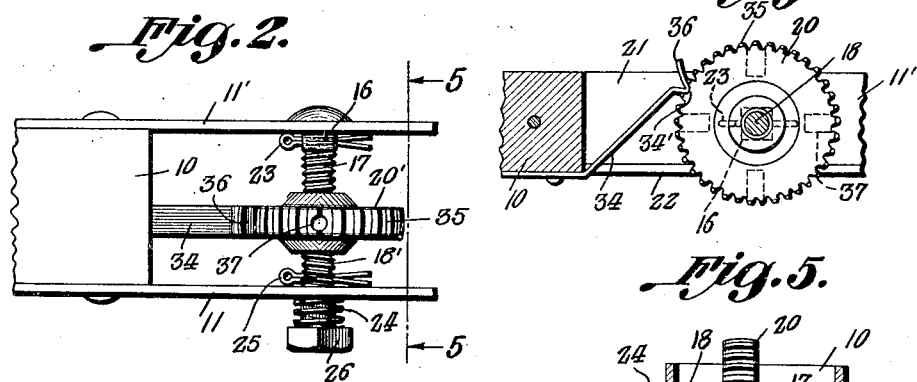
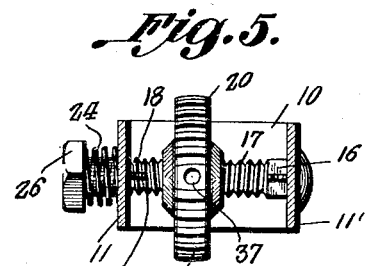
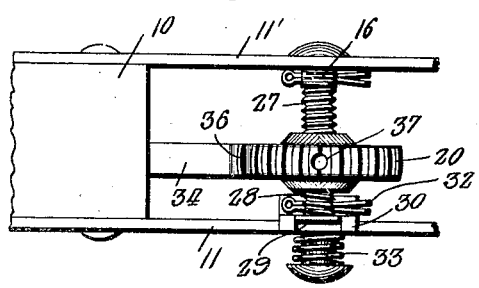
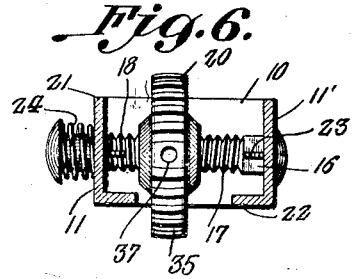
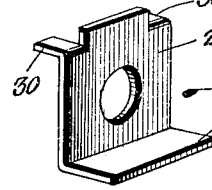
Charles F. Hover, Inventor
By Horace O. Chandlee
Attorney Patented Mar. 17, 1931

1,797,087

UNITED STATES PATENT OFFICE

CHARLES F. HOVER, OF CONRAD, MONTANA

PITMAN CONNECTION

Application filed November 6, 1929. Serial No. 405,239.

This invention relates to new and useful improvements in cutting devices, and particularly to cutting devices used on mowing machines, reapers and binders, and the like, wherein the cutter bar is operated by a reciprocating pitman rod.

The principal object of the invention is to provide a novel and improved pitman rod, with means for properly attaching the same to the cutter bar, which will permit ready attachment thereto and removal therefrom, as well as adjustment to compensate for wear between the connections between the pitman and cutter bar.

Other objects and advantages will be apparent from the following description when taken in connection with the accompanying drawing.

In the drawing:

Figure 1 is a plan view of a portion of the pitman and cutter bar of a mowing machine, showing one form of the invention applied thereto, and partly in section.

Figure 2 is a view, similar to Figure 1, showing a modified form of the adjustment feature.

Figure 3 is a view, similar to those mentioned above, showing a further modification of the device.

Figure 4 is a sectional view on the line 4—4 of Figure 1.

Figure 5 is a sectional view on the line 5—5 of Figure 2.

Figure 6 is a vertical transverse sectional view on the line 6—6 of Figure 1.

Figure 7 is a perspective view of the plate 29.

Referring particularly to the accompanying drawing and especially to Figures 1 and 6, 10 represents a portion of the pitman arm of a mowing machine, on the end of which are bolted the parallel longitudinally extending arms 11, which have their outer ends formed with the socket portions 12, for embracing the ball 13, carried by the adjacent end of the cutter bar 14. One of the arms 11, which is designated as 11', to distinguish it from the other arm, is formed with a square opening 15, for receiving the square shank 16, of the bolt 17, while the other arm 11 is provided with a circular opening 19, receiving the bolt 18. These bolts have their threaded ends directed inwardly into the space between the arms 11 and 11', the former bolt, 17, having right-hand threads, while the bolt 18 has left-hand threads. The threaded ends of these bolts are received in the central transverse, and oppositely threaded opening 19' formed through the disk 20, whereby to move the bolts inwardly and outwardly, when said wheel or disk is rotated in the proper direction. It will be noted that the arms 11 and 11' are formed from angle metal, and have the vertical webs 21, and the horizontal webs 22, the former of which receive the bolts therethrough, as already explained. Disposed through each of the bolts 17 and 18, just inwardly of the inner vertical face of an arm, is a split pin or key 23, one end of which is adapted to bear on the upper face of a horizontal web 22, to prevent rotation of the bolt. The pin or key 23, of the bolt 17, however, serves to prevent outward sliding movement of the bolt, through the opening of the arm, while the square shank, of the bolt, fitting within the correspondingly formed opening of the arm, prevents rotation of the bolt. Partial rotation of the other bolt 18, in either direction, will cause an end of the pin or key 23 to bear against the upper face of the horizontal web of the arm, whereby to effectively prevent further rotation of said bolt. Encircling the bolt 18, between the head thereof, and the adjacent side face of the arm, is a coil spring 24, which urges the arm inwardly to maintain the socket members 12 in firm, but yielding contact with the ball 13.

From the foregoing it will readily be seen that, upon rotation of the disk 20, in one direction, the bolts 17 and 18 will be driven outwardly, and force said arms apart, whereby to disengage the socket ends thereof from the ball. The arms 11 and 11' will remain in this position, until the operator is ready to reengage the sockets with the ball, thus greatly facilitating this reengagement, and reducing the time required therefor.

In the event that the arms 11 and 11' are simply flat metal strips, and do not have the webs, as shown in the first form of the invention, there will be nothing to prevent the bolt 18 from rotating. A pin 25 is used to prevent outward movement of the bolt through the opening of the arm, but to prevent rotation of the bolt, while the disk 20 is being rotated, I engage and hold the angular head 26 of the bolt. The other bolt is held from turning by the engagement of its angular shank 16 in the opening 15 of the arm.

In the form shown in Figure 3, the bolt 27 is held against rotation in the same manner as the bolt 18, of the previously described form. The bolt 28, however, is held by means of the plate 29, which is slipped on the bolt, between the arm 11 and the disk 20, such plate having a pair of lugs 30 struck from its upper end which are engaged over the upper edge of the arm, while the lower end of the plate has an angularly extending portion 31, against which the pin 32 is adapted to engage, whereby to hold the bolt against rotation. A coil spring 33, is used in this form, for the same purpose as in the previously described forms of the invention.

It will be understood that, when the arms 11 and 11' are formed of angle metal, as in the first described form of the invention, a round shank bolt may be used in each of the arms, thus dispensing with the square shank bolt in the arm 11'.

There is thus provided a simple device for facilitating the removal and application of the pitman end to the ball of the cutter bar of a mower, or the like machine. Furthermore, the present device serves to maintain the socket portions of the arms of the pitman, in proper contact with said ball, and automatically compensates for wear between these parts.

Secured to the lower face of the end of the pitman bar is one end of a leaf spring 34, the free end of which is bent, as at 34, to form a nose which engages with the peripheral ratchet teeth 35, of the disk 20, for the purpose of preventing retrograde rotation of the disk. To facilitate disengagement of the spring pawl 34 from the disk teeth, the free end of the spring is extended upwardly to form the fingerpiece 36. Thus the spring pawl can be held out of engagement with the disk, to permit the latter being rotated backwardly, whereby to spread the arms 11 and 11' apart, for disengagement of the socket members from the ball.

In the periphery of the disk 20 there are formed the series of sockets 37, in any one of which is adapted to be inserted the end of a nail, or like implement, for the purpose of rotating the disk.

What is claimed is:

1. In a connection between the ball member of a sickle bar and a pitman rod, a pair of flexible apertured arms carried by the pitman rod having socket members embracing said ball, oppositely threaded and headed members disposed inwardly through the arms, a rotatable disk between the arms and receiving said threaded members therein, means for holding the threaded members against rotation within the said arms, and resilient means between the head of one of said rotatable threaded members and the adjacent arm.

2. In a connection between the ball member of a sickle bar and a pitman rod, a pair of flexible arms carried by the rod having socket terminals embracing the ball, each of the arms having an opening therethrough, a bolt disposed inwardly through each of the openings, a rotatable disk between the arms receiving the threaded ends of said bolts, said bolts being oppositely threaded, means on each bolt for engagement with the arm to prevent rotation of the bolt, a spring on one of the bolts between the head of the bolt and the arm for resiliently urging the arms into contact with the ball, and releasable means for holding the disk against retrograde rotation.

In testimony whereof, I affix my signature.

CHARLES F. HOVER.